(No Model.)
T. THOMPSON.
NUT LOCK.
No. 341,185. Patented May 4, 1886.
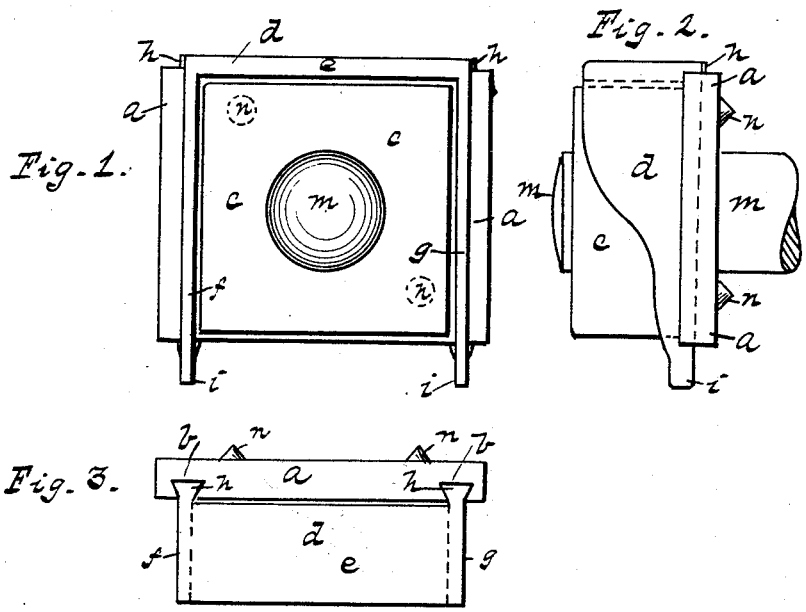
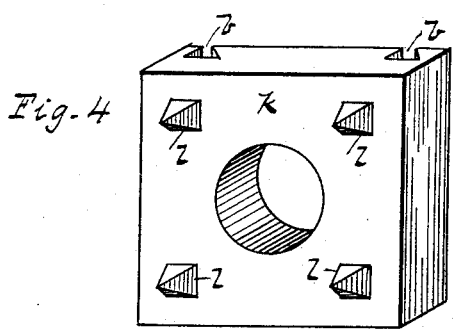
Witnesses:
M. E. Harrison
Jno. N. Roney
Inventor.
Thomas Thompson
Per O. D. Lewis
Attorney.

UNITED STATES PATENT OFFICE.

THOMAS THOMPSON, OF PITTSBURG, PENNSYLVANIA.

NUT-LOCK.

SPECIFICATION forming part of Letters Patent No. 341,185, dated May 4, 1886.

Application filed March 4, 1886. Serial No. 194,053. (No model.)

*To all whom it may concern:*

Be it known that I, THOMAS THOMPSON, a citizen of the United States, residing at Pittsburg, in the county of Allegheny and State of Pennsylvania, have invented certain new and useful Improvements in Nut-Locks; and I do hereby declare the following to be a full, clear, and exact description of the invention, such as will enable others skilled in the art to which it pertains to make and use the same, reference being had to the accompanying drawings, which form a part of this specification.

My invention relates to an improvement in nut-locks, the object being to provide a means whereby nuts may be securely locked that they may not become loose; and with this end in view my invention consists in placing a washer or plate provided with vertical dovetailed slots, in which are secured a cap neatly fitting about the sides of the nut, as will be more fully described hereinafter.

In the accompanying drawings, Figure 1 is a front elevation of my improved nut-locking device, such as I prefer to use when locking nuts against a metallic surface. Fig. 2 is an end elevation of the same. Fig. 3 is a plan view in which are shown the dovetailed slots formed in the washer. Fig. 4 is a perspective rear view of a washer such as I prefer using in connection with wood-work.

To put my invention into practice, I construct a washer, $a$, having a circular opening through the center and two parallel vertical dovetailed slots $b$, formed in the front surface and extending the entire length of the same. At the rear of this washer are formed one or more conical projections, $n$, which are forced into the plate against which the washer $a$ is placed, either by the pressure of the nut $c$ or by first marking the exact position and afterward forming the impressions with a center punch. I next provide a cap or box, $d$, consisting of three sides, $e\,f\,g$, two of which, $f\,g$, are dovetailed at the rear to fit neatly into the vertical dovetailed slots $b$, formed in the face of the washer $a$. The two sides $f\,g$ of this cap taper toward the base $i$ and project a short distance below the washer $a$. These ends $i$ are capable of being bent when the cap $d$ is in place, thus effectually preventing the same from becoming detached from the washer $a$.

When my improved nut-locks are used against a wooden or soft surface, I prefer to use a washer, $k$, such as shown at Fig. 4 on the drawings, having a number of large sharp projections, $l$, which readily embed themselves into the wood and secure the washer firmly. The cap $d$, used with this washer $k$, is the same as that before described.

In operation I first place the washer $a$ over the end of the bolt $m$, and, by a slight tap of the hammer, mark the position of the conical projections $n$, on the plate through which the bolt $m$ is passed. I now form the impressions in the plate corresponding to the conical projections $n$ on the washer $a$ with a center punch. The washer $a$ is again placed over the bolt $m$, and the nut $c$ screwed in place. The cap $d$ is now put in position and fits neatly about the nut $c$. The small ends $i$, projecting below the washer $a$, are bent, which operation secures the washer $a$ and cap $d$ together.

Having thus described my invention, what I claim, and desire to secure by Letters Patent, is—

1. A nut-locking device consisting of a washer having one or more sharp projections formed on the rear surface and parallel dovetailed slots formed in the front face, a circular opening between the parallel slots, through which the end of the bolt is passed, a cap or box consisting of three sides constructed to fit neatly about the nut, two of the sides being dovetailed to correspond to the parallel dovetailed slots of the washer, and project a suitable distance below the same, to admit of being warped or bent, substantially as set forth.

2. A nut-locking device consisting of a washer having one or more projections formed on the rear surface and parallel dovetailed slots formed in the front face, a circular opening between the parallel slots through which the end of the bolt is passed, a cap or box consisting of three sides constructed to fit neatly about the nut, two of the sides being dovetailed to correspond to the parallel dovetailed slots of the washer, substantially as described.

THOMAS THOMPSON.

Witnesses:
H. T. MORRIS,
C. B. BOSTWICK.